United States Patent

[11] 3,578,355

[72] Inventor Carl E. Oeder
 256 Shawhand Road, Morrow, Ohio 45152
[21] Appl. No. 795,118
[22] Filed Jan. 29, 1969
[45] Patented May 11, 1971

[54] AIR SUSPENSION SYSTEM
 6 Claims, 5 Drawing Figs.
[52] U.S. Cl. .................................................. 280/124,
 267/52
[51] Int. Cl. .................................................... B60g 11/46
[50] Field of Search ........................................ 280/124;
 267/18, 27, 29, 32, 47, 52, 56

[56] References Cited
UNITED STATES PATENTS
| | | | |
|---|---|---|---|
| 3,494,609 | 2/1970 | Harbers.......................... | 267/52 |
| 3,063,732 | 11/1962 | Harbers.......................... | 267/32X |
| 3,269,418 | 8/1966 | Jackson.......................... | 267/15X |

Primary Examiner—Philip Goodman
Attorney—Melville, Strasser, Foster & Hoffman

ABSTRACT: An air suspension leaf spring assembly for drop center axles used on vehicles, such as trucks and the like. The leaf spring is secured to the axle at its center and suspended from the vehicle frame at an intermediate point by an air spring, with the ends of said leaf spring being free to move in a restricted vertical path.

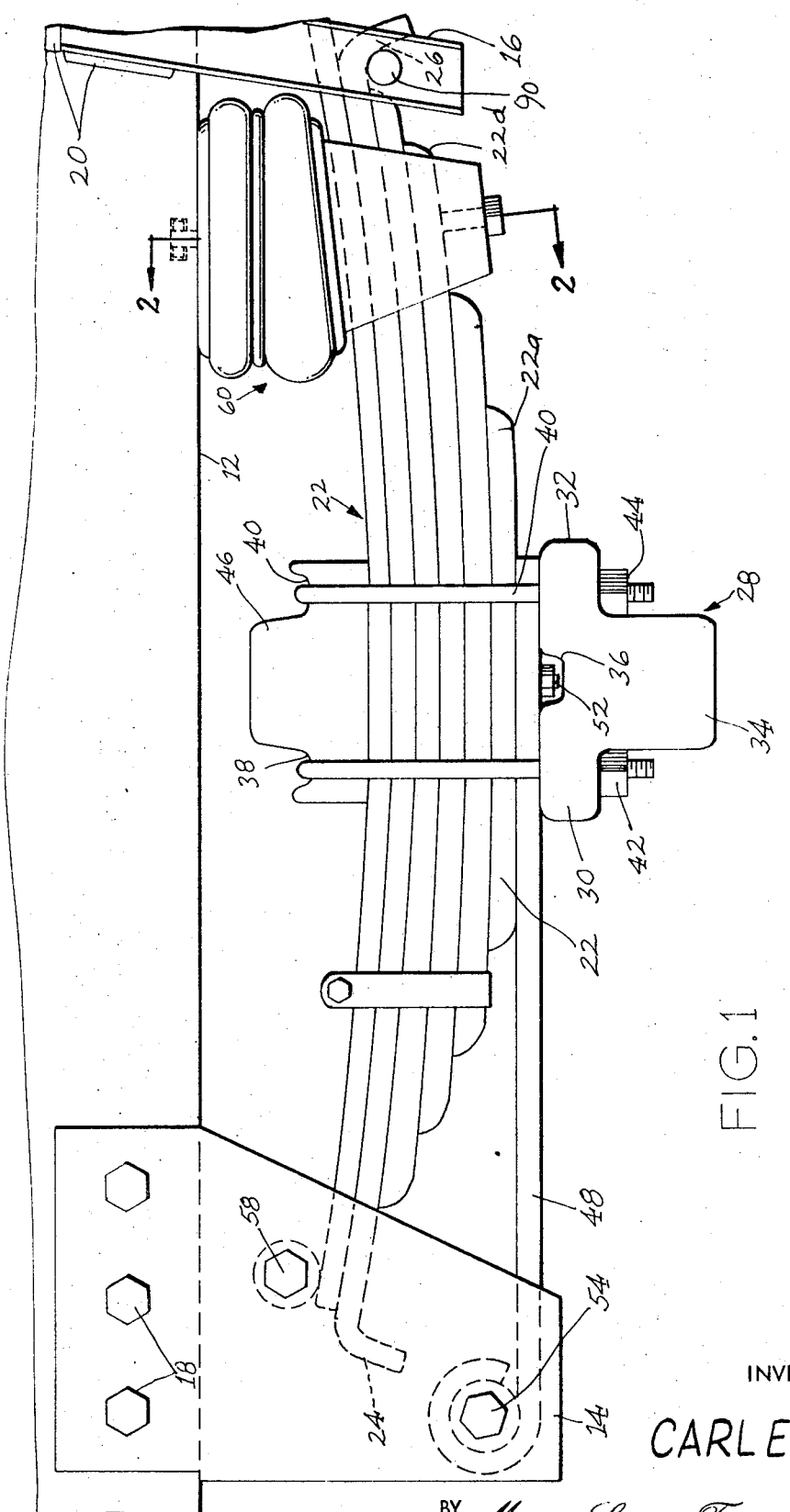

Patented May 11, 1971
3,578,355
2 Sheets-Sheet 2
FIG. 5
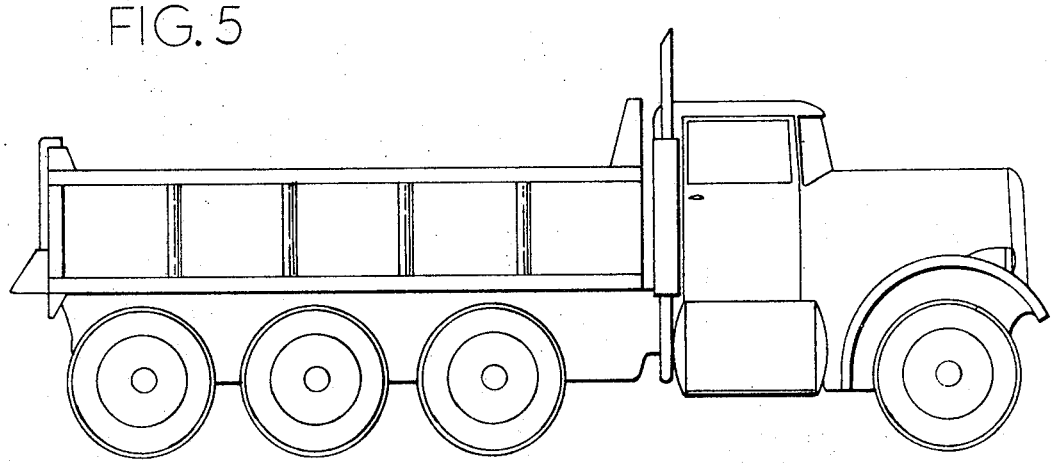
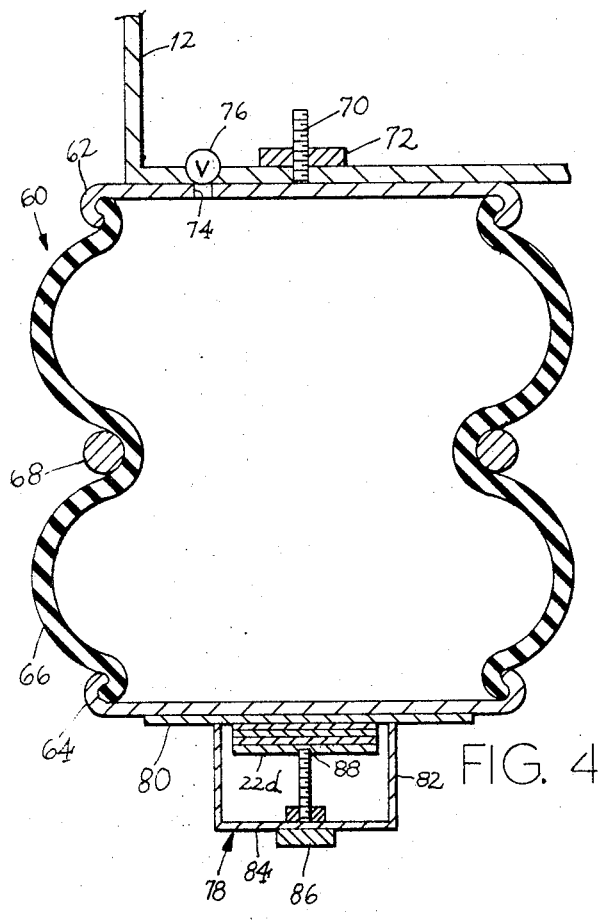
FIG. 4
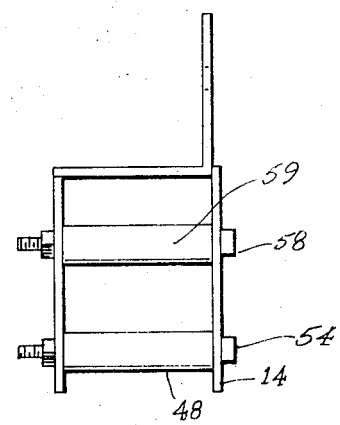
FIG. 3
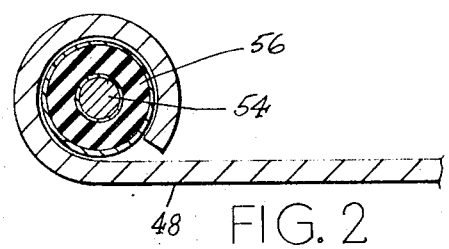
FIG. 2
INVENTOR/S
CARL E. OEDER
BY *Melville, Strasser, Foster and Hoffman*
ATTORNEYS

AIR SUSPENSION SYSTEM

BACKGROUND OF THE INVENTION

This invention relates to a new suspension assembly for use on vehicles, such as trucks and the like. The assembly, when used on a drop center axle, results in a vehicle having an increased load-carrying limit, and superior road-handling characteristics compared to prior art vehicles modified with an extra fixed straight axle.

While the trucking industry has remained stable in some respects, one noteworthy change has been in the increased size and capacity of the load-carrying vehicles. Other innovations, such as design changes in tires, have been made in order to increase the "payload" of a given vehicle.

However, most attempts to increase the payload have been directed at the use of an additional axle. One reason this is the conventional approach is that nearly all states which regulate intrastate trucking, baseload capacity formulas on the number of axles. With the addition of an axle, the load capacity for the vehicle is limited only by the permissible gross weight.

But even with this innovation, problems arose. Typically, for example, a dump tuck is provided with a pair of tandem fixed axle assemblies and a forward movable steering axle. The addition of a third fixed axle at the rear increased the load capacity, but affected the road-handling characteristics of the vehicle in the loaded and unloaded condition. Such vehicles were difficult to control on curves, and on road under inclement conditions. The problem was only partially solved by including with the added axle means for lifting or retracting same to a position off the ground. But in the loaded condition, the problem remained.

The present invention found an answer to this perplexing problem with the addition of a drop center axle adjacent to and forward of the tandem rear axles. The added axle, which has been provided with a unique air suspension system, is tied into the steering mechanism so that the wheels connected thereto turn at an angle which is a fractional portion of the angle of the forward wheels. This system not only increases the "payload" it reassures the driver that the vehicle is more road worthy than previously known vehicles.

BRIEF SUMMARY OF THE INVENTION

In the practice of this invention, a suspension assembly is provided for a drop center axle for use on vehicles, such as trucks and the like. The assembly includes two brackets suspended from the vehicle frame, between which is disposed a leaf spring assembly. Mounted substantially parallel to the lowermost leaf of said spring assembly is a leaf spring which carries an eye at one end for mounting in one of said brackets. The opposite end is secured between the axle and the midpoint of said leaf spring assembly. This arrangement prevents any movement of the spring assembly forwardly and rearwardly of said vehicle frame, but allows the end thereof to move vertically between said spring eye and an upper restraining member.

The opposite end of the leaf spring assembly is free to move within the other bracket. Actually, the assembly rides on a transverse rod but may move vertically as a result of a sudden jolt caused by hitting a chuck hole. Intermediate the latter bracket and the midpoint of said leaf spring assembly, there is provided an air spring urging said assembly toward said transverse rod. The air spring is constructed such as to support the axle under a load by establishing a predetermined pressure therein, but has the ability to yield or breathe with any sudden impact on the axle. The air spring is adapted with a valve which reestablishes the pressure thereby assuring the proper suspension for the axle.

BRIEF DESCRIPTION OF DRAWINGS

FIG. 1 is a side elevation of the air suspension assembly constructed according to the teachings of the present invention.

FIG. 2 is an enlarged sectional view of the leaf spring showing the end construction for mounting in the forward leaf spring bracket.

FIG. 3 is a side view of the suspended forward leaf spring.

FIG. 4 is an enlarged sectional view of the air spring taken along line 4—4 in FIG. 1.

FIG. 5 is a reduced side elevation of a typical vehicle utilizing the suspension assembly of this invention.

DETAILED DESCRIPTION OF PREFERRED EMBODIMENTS

Referring now in greater detail to the accompanying drawings, there is shown in FIG. 1 a suspension assembly 10 suspended from the longitudinal frame member 12 of a vehicle. The suspension assembly 10 includes a forward bracket 14 and a rear bracket 16. The brackets are fixed to the frame by means such as bolts 18 and/or by welding 20. While the description to follow will be limited to the discussion of a single such assembly, it should be understood that a pair are used for each axle suspended thereby.

A leaf spring assembly 22 is disposed between said brackets in such a way that its forward and rear portions 24 and 26 respectively, are free to move in a vertical direction within said brackets 14 and 16. By means to be described hereinafter, the movement is restricted within predetermined limits.

Located centrally of said leaf spring assembly 22 is the axle 28. The axle is a drop center axle, the type currently used as the front steering axle on most commercial trucks, and is characterized by flanges 30, 32, and the central portion 34 having a recess 36 on its upper surface. A similar construction is found on the other side of the axle.

The leaf spring assembly 22, which may comprise seven leaves of spring steel arranged in pyramidal relationship, is joined to the axle 28 by means of the U-shaped clamps 38 and 40, the ends of which are received in flanges 30 and 32 respectively, and anchored by bolts 42 and 44 threaded thereon. It will be seen from FIG. 1 that a spring pad 46, with grooves for the clamps 38 and 40, is used to assist in clamping the spring assembly to the axle.

However, before this anchoring is completed, a leaf spring 48, such as shown in FIG. 2, is disposed between the lowermost leaf 22a and the upper surface of the axle 28. The free end 50 of the leaf spring 48 is bolted to the several leaves of the assembly 22 by means of the bolt 52. The recess 36 provides clearance for the bolt 52 so that intimate contact is possible between the leaf spring 48 and the axle 28.

The opposite end 52 of the leaf spring 48 is provided with an eye through which the bolt 54 passes to secure same to bracket 14. To minimize frictional contact between said spring and said bolt, a bushing 56 is used. A suitable bushing is one which has a rubber layer disposed between an inner and outer steel layer.

FIG. 3 is an end view of the bracket 14 showing the leaf spring 48. Above said spring there is shown a transverse member 58. This member, with rubber bushing 59, acts as the upper restraining means for the vertical movement of the leaf spring assembly end 24.

Situated at an intermediate point between the location of the spring pad 46 and the leaf assembly end 26, there is provided an air spring 60, which when operative urges said leaf assembly 22 away from said frame 12.

FIG. 4 is an enlarged sectional view of the air spring 60 shown at the right in FIG. 1. A suitable air spring for use in this structure is one sold by FIRESTONE under the name AIR-RIDE. In brief, the spring comprises a bellow cap 62, a bellow base 64, the bellows 66, and at least one annular ring 68 separating the bellow portions of the spring. To secure the air spring to the frame 12, a threaded projection 70, centrally disposed on said bellows cap 62, is received into a hole in said frame. A bolt 72 is threaded onto said projection to suspend the air spring in the manner shown. Finally, a valve opening 74, with valve 76, is provided as the means to activate said air spring to the desired pressure. In order to prevent permanent damage to said spring and its bellows, the valve is such as to permit the spring to breathe. That is, with a sudden impact on the axle, the air spring 60 could be overloaded to the point of failure. The valve 76 permits a release of air therethrough. When the danger has passed, the valve 76 is reactivated to restore the pressure in the bellows to the desired level. A valve found capable of performing this function is the pressure control valve No. 1400 manufactured by Sealco Air Brakes, Inc.

To accommodate the connection of the air spring 60 to the leaf spring assembly 22, a frame 78 is secured to the base. This latter frame includes a baseplate 80 contiguous with and secured to said bellow base 64 such as by welding. Additionally, there is the member 82 into which certain of the leaf spring assembly leaves pass. To the lowermost portion 84 of member 82, a threaded element 86 is passed to engage at 88 the nearest leaf 22d of said spring assembly 22. This latter engagement tends to keep the elements from shifting with respect to one another.

It will be seen that as the air spring is activated by means of valve 76, the bellows 66 expand urging the leaf spring assembly 22 toward the roadbed upon which the vehicle is riding. To limit this movement, a transverse rod 90 is provided on bracket 16. However, with any impact such as discussed above, the bellows will collapse causing the leaf end 26 to rise above said rod 90.

It should thus be apparent that the action of the suspension assembly 10 will be much like that of a rocking motion. And, despite the free motion of the ends of the leaf spring assembly 22, the suspension is quite effective for the purpose described.

While not intending to be so limited in application, FIG. 5 represents a typical vehicle to which this invention is applicable. One of the difficulties encountered with trucks of this type, which are rated at up to 20 tons, is in its road handling characteristics. Normally, in such a vehicle, all of the rear wheels are on a fixed axle. However, by utilizing a drop center axle as the axle behind the cab, it is possible to attach steering mechanism thereto. That is, the wheels will be turned by the same mechanism turning the front wheels, but only on a fractional ratio. In other words, by tying in at about the midpoint of the steering rod, the turning angle will be about one-half the angle of the front wheels. This permits better control of the truck under loaded conditions without tearing or stripping the rubber from the wheels.

Since the description set forth above was directed to the preferred embodiment, and since modifications may become apparent to those skilled in the art, no limitation is intended to be imposed on this invention except as set forth in the appended claims.

I claim:

1. In combination with a vehicle body having a frame for mounting wheel assemblies, an improved suspension system comprising a forward and a rear bracket suspended from said frame, a leaf spring assembly disposed therebetween, each said bracket provided with a pair of side members for controlling the vertical movement of said leaf spring assembly between first and second positions and eliminating the side movement thereof, said leaf spring assembly comprising a plurality of contiguous pyramidially disposed leaves, one of said leaves having one end joined to said forward bracket and the other end joined to said leaf spring assembly at a first location, a drop center-type axle secured at said first location, and an air spring joining said frame to said leaf spring assembly at a second location, said second location being at a point between said first location and said rear bracket.

2. The combination claimed in claim 1 wherein the endmost forward portion of said leaf spring assembly is movable in a vertical path above the end of said leaf spring.

3. The combination claimed in claim 2 including a restraining member in said forward bracket above said endmost portion of said leaf spring assembly.

4. The combination claimed in claim 1 wherein said air spring comprises an air pressure chamber and means for pressurizing said chamber to a predetermined level.

5. The combination claimed in claim 4 wherein said means for pressurizing the chamber is a two-way valve permitting said collapse to collapse caused by any sudden impact thereon.

6. The combination claimed in claim 4 including a member on said rear bracket to counteract the action of said air spring.